Patented Sept. 15, 1953

2,652,328

UNITED STATES PATENT OFFICE 2,652,328

HIGH-SPEED SILVER DYE BLEACHOUT TAKING AND PRINTING FILM

Joseph A. Sprung, Binghamton, N. Y., assignor to General Aniline & Film Corporation, New York, N. Y., a corporation of Delaware No Drawing. Original application April 18, 1950, Serial No. 156,730, now Patent No. 2,635,960, dated April 21, 1953. Divided and this application July 9, 1952, Serial No. 297,989

2 Claims. (Cl. 95—2)

The present invention pertains to high speed multilayer material for processing by the silver dye bleachout method, which may be used either for taking or printing material, and which is characterized by the presence in the layer destined to yield the cyan image, of a color former reactive with a metal salt to form a cyan metal complex compound.

The most popular commercial multilayer color material available at the present time is processed by the method known as color development. The dye images formed in such material by this mode of processing are of the azomethine or quinonimine class.

During the color development process, the exposed silver halide functions as an oxidizing agent of the color developer which in turn combines with the color former either present in the multilayer material or in the color developers for the same to yield yellow, magenta, and cyan azomethine or quinonimine dye images in the blue, green, and red sensitive layers respectively.

Dyes of the azomethine or quinonimine class have a number of shortcomings, the principal one being their instability toward light and atmospheric fumes. Due to this inherent deficiency in the color development method, attempts have been made to adapt other classes of dyes, particularly the azo dyes, to the photographic process.

An example of such proposals is found in the United States Patent 2,424,256, which discloses the production of the azo dye images by color development of an exposed silver halide emulsion in the presence of an azo dye coupling component with a sulfonehydrazide. During development the sulfonhydrazide is converted to a diazo sulfone and reacts directly with the coupling components to form azo dyestuffs.

Another and rather widely discussed method involving the formation of azo dye images is the silver dye bleachout process. This method operates on the principle that yellow, magenta, and cyan azo dyestuffs which are either incorporaed in or subsequently formed in the blue, green, and red sensitive layers of a multilayer material are bleached selectively in situ with a previously developed silver image. In this case the silver image functions as a reducing agent and the results are essentially the same as those produced by the color development method in which the silver halide is the imagewise oxidant.

The silver azo dye bleachout material which is commercially available at the present time contains the azo dyes in the sensitized layers thereof. The azo dyes are rendered non-migratory in such layers by precipitation therein by means of biguanides. Such material from its very nature is of slow speed. This is attributable, on the one hand, to the absorption of light by the azo dyes present in the layers which act as filter dyes, and, on the other hand, to the strong desensitizing action of the biguanides. For this reason, the silver azo dye bleachout procedure has been limited in application to the processing of printing material.

I have now discovered multilayer material capable of being processed by the silver dye bleachout method which is free from the objections to the presently available bleachout material. My multilayer material, because of its inherent speed, is capable of being utilized either for taking material, i. e., for exposures in the cameras, or as printing material.

My multilayer taking material is characterized by the presence in the emulsion layers designed to receive the yellow and magenta images of colorless non-diffusing azo dye couplers capable of reacting with one and the same diazonium salt to form yellow and magenta dyes. The layer designed to receive the cyan image contains a colorless heterocyclic nitrogenous compound which is capable of being bleached by a silver dye bleaching bath and which has the ability to react with a metal salt to form a cyan metal complex. This material permits the formation of the yellow and magenta azo dyes and the cyan metal complex at a point subsequent to exposure so that the material has high initial speed.

My multilayer material utilized as printing material is characterized by the presence in the layers designed to receive the yellow and magenta images of yellow and magenta non-diffusing azo dyes which are bleached by the usual silver dye bleachout baths. The layer designed to receive the cyan image, however, contains the colorless heterocyclic nitrogenous compound capable of forming a cyan metal complex upon treatment with a metal salt.

Taking and printing material of the type mentioned, the processing of such material by the silver dye bleachout method, and a silver halide emulsion designed to receive the cyan dye image and containing a colorless heterocyclic nitrogenous compound capable of being bleached by a silver dye bleachout bath and of forming a cyan metal complex compound upon reaction with a metal salt constitute the purposes and objects of the present invention.

It is apparent from what has been said that the key to my invention is the utilization in the red sensitive layer of multilayer material of the colorless heterocyclic nitrogenous compound which is capable of yielding cyan metal complexes upon treatment with a metal salt. It is the correlation of the function of the layer containing such compound with the layers containing the colorless azo dye couplers for the yellow and magenta azo dyes in the silver dye bleachout method which leads to the improvements wrought by my invention.

It is known that there are color couplers which by reaction with one and the same diazonium salt will yield yellow and magenta azo dyestuffs. It has not been possible, however, to find a coupler which will react with such diazonium salt to simultaneously form a cyan azo dye. It is, therefore, necessary to utilize for the formation of the cyan dye image a compound which is sensitive to the silver dye bleach bath and which is likewise capable of forming a cyan color by reaction with an agency other than a diazonium salt solution.

It has been ascertained that compounds which will effectively produce cyan colors of the desired density must meet a number of prerequisites, particularly the following:

(1) The compound must not desensitize photographic emulsions;

(2) The compound must be capable of being rendered non-migratory in photographic emulsions by permitting the addition of a non-diffusing radical thereto;

(3) The compound must be readily bleached in situ with the silver image;

(4) The compound must produce a cyan metallic complex which has acceptable minus-red spectral characteristics, and (5) The compound must form the cyan complex easily and such complex must not be fugitive to atmospheric conditions and must be stable to gelatin at its isoelectric point.

A great many components have been tested for the purpose of ascertaining their value as couplers for formation of the cyan complex dye. My conclusion based upon such extensive work is that the compounds which meet the aforementioned prerequisites are those heterocyclic compounds which contain one of the following polyfunctional groups either as such or in the indicated tautomeric forms:

2-isonitroso-1,3-diketone,

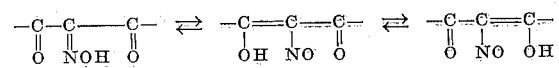

or 2-isonitroso-1-imino-2-ketone,

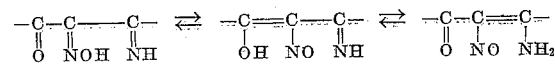

The heterocyclic compounds possessing such polyfunctional groups have the following constitution:

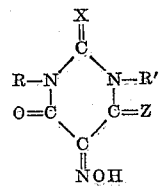

and

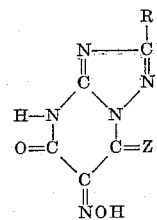

in which X is =O, =S, =N—Y, or

Y is hydrogen, an aliphatic radical, such as alkyl, i. e., methyl, ethyl, propyl, amyl, decyl, dodecyl, tetradecyl or the like, carboxyalkyl, i. e., carboxymethyl, carboxyethyl, and the like, sulfoalkyl, i. e., sulfomethyl, sulfoethyl, alkylsulfonyl, such as methylsulfonyl, ethylsulfonyl, and the like, an aromatic radical, such as aryl, i. e., phenyl, naphthyl, and the like, alkoxyaryl, such as methoxyphenyl, ethoxyphenyl, tetradecoxyphenyl, and the like, arylsulfonyl, such as phenylsulfonyl, aminophenylsulfonyl, and the like, sulfoaryl, such as sulfophenyl, and the like, or cyano, R and R' are hydrogen, alkyl as above, or aryl as above, and Z is =O or =NH.

The above compounds may exist in the form indicated or in the following tautomeric forms:

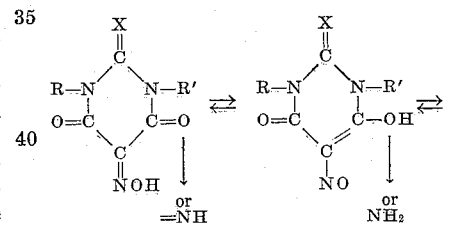

The following compounds illustrative of those within the above classification have been found to be suitable for my purposes:

(1)

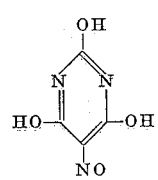

5-nitrosobarbituric acid or [5-nitroso-2,4,6-trihydroxypyrimidine]

(2)

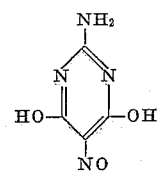

2-amino-4,6-dihydroxy-5-nitroso-pyrimidine (3) 6-amino-2,6-dihydroxy-5-nitroso-pyrimidine (4) 2,6-diamino-4-hydroxy-5-nitroso-pyrimidine (5) 6-amino-2-cyanamino-4-hydroxy-5-nitroso-pyrimidine (6) 1,3-diethylvioluric acid or [1,3-diethyl-5-oximinohexahydro-pyrimidine-trione-2,4,6]

(7) 1,3-diethyl-4-imino-5-oximinohexahydropyrimidine-dione-2,6

(8) 1,3-diphenyl-5-oximinohexahydropyrimidine-trione-2,4,6

(9) 4,6-dihydroxy-2-mercapto-5-nitroso-pyrimidine

(10) 6-amino-4-hydroxy-2-mercapto-5-nitroso-pyrimidine

(11) 4,6-diamino-2-mercapto-5-nitroso-pyrimidine

(12) 1,3-diphenyl-5-isonitroso-2-thiobarbituric acid

(13) 1-methyl-5-isonitrosobarbituric acid

(14) 1-methyl-6-imino-5-oximinohexahydropyrimidine-dione-2,4

(15) 1-methyl-3-ethyl-5-isonitrosobarbituric acid

(16) 1-methyl-6-imino-5-isonitrosohexahydropyrimidone-4-thione-2

(17) 2-cyanamino-4,6-dihydroxy-5-nitrosopyrimidine

(18) 2-decylamino-4,6-dihydroxy-5-nitrosopyrimidine

(19) 2-dodecylamino-4,6-dihydroxy-5-nitrosopyrimidine

(20) 2-carboxymethylamino-4,6-dihydroxy-5-nitrosopyrimidine

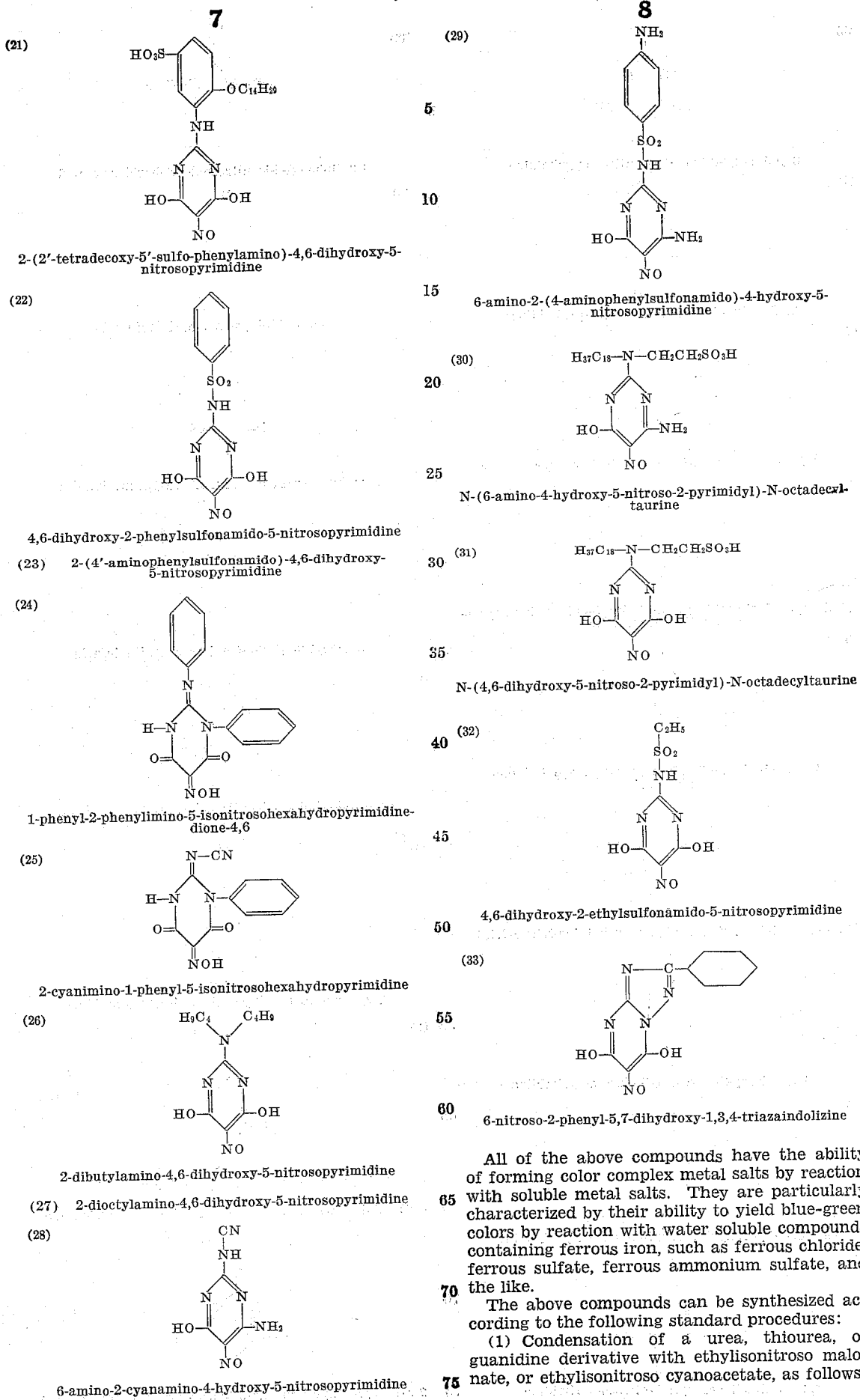

All of the above compounds have the ability of forming color complex metal salts by reaction with soluble metal salts. They are particularly characterized by their ability to yield blue-green colors by reaction with water soluble compounds containing ferrous iron, such as ferrous chloride, ferrous sulfate, ferrous ammonium sulfate, and the like.

The above compounds can be synthesized according to the following standard procedures:

(1) Condensation of a urea, thiourea, or guanidine derivative with ethylisonitroso malonate, or ethylisonitroso cyanoacetate, as follows:

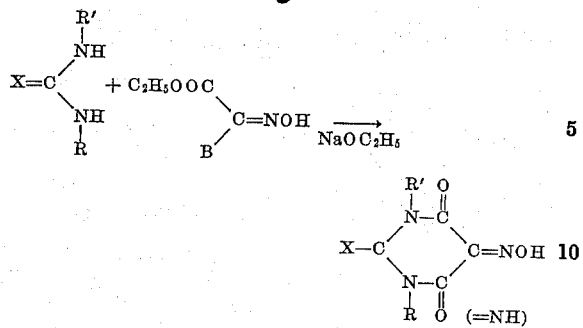

(2) Condensation of a urea, thiourea, or guanidine derivative with ethyl malonate or ethyl cyanoacetate, followed by nitrosation of the product as follows:

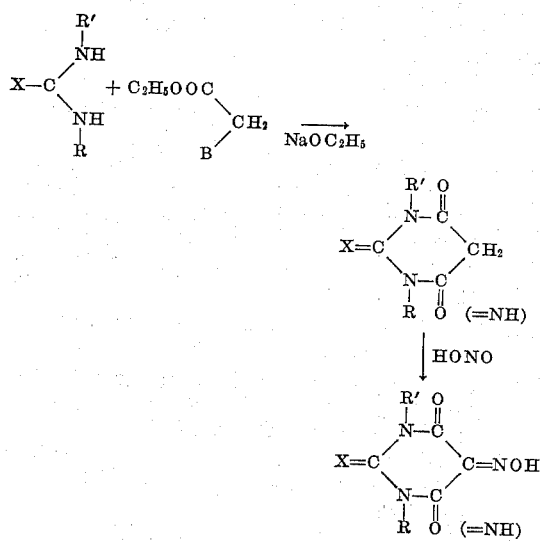

In these equations, R, R' and X have the values given above.

My printing material is a tripack, the three layers of which are sensitized according to conventional practice, i. e., the outermost layer to blue light, the intermediate layer to green light, and the lowermost layer to red light. The blue sensitive layer contains a non-diffusing yellow azo dyestuff in which the non-diffusing group appears in the diazo component. The coupling component for such dyes is preferably a pyazolone. Suitable dyes and their method of manufacture are described in U. S. P. 2,629,658, issued February 24, 1953. The green sensitive layer contains a non-diffusing magenta azo dye in which the non-diffusing group appears in the diazo component. The coupling component is preferably a naphthol. Satisfactory dyes and their method of preparation are disclosed in the aforesaid U. S. Patent. The red sensitive layer contains one of the aforesaid heterocyclic nitrogenous compounds, said compound preferably containing a radical rendering the compound fast to diffusion in the emulsion layer.

Such material is processed according to the bleachout method as follows: The material is exposed, developed in a black and white developer and fixed. It is then subjected to a silver dye bleaching bath of the type described in my U. S. Patent 2,564,238, issued August 14, 1951. This bath destroys the azo dyes at the silver image and modifies the heterocyclic nitrogenous compound in the red sensitive layer so that it is no longer capable of forming a cyan metal complex compound at the places of the silver image.

The material is now bleached to remove the silver images and the residual silver halides removed by fixing. At this point the cyan image is produced by treatment with a solution containing a metal salt, preferably a water soluble iron salt.

My tripack material when used as taking material is sensitized as noted above. In the blue sensitive top layer, there is incorporated a non-diffusing yellow azo color former, preferably a 1-phenyl-pyrazolone. In the green sensitive layer is located a non-diffusing azo magenta color former, preferably a naphthol. The red sensitive layer contains one of the aforesaid heterocyclic nitrogenous cyan complex formers which has been rendered fast to diffusion in the emulsion.

The taking film is processed as follows: It is exposed, developed in a black and white developer, and fixed. It is then treated with a diazonium salt solution which is capable of reacting with the color formers in the blue and green sensitive layers to produce therein yellow and magenta azo dyes respectively. Preferably, the diazonium compound is one resulting from the tetrazotization of a sulfonated benzidine, such as benzidine-2,2'-disulfonic acid.

The tripack is then treated with a silver dye bleach bath of the purpose of destroying the azo dyes at the silver image and of bleaching the cyan complex former at the silver image. The silver image is then bleached and the silver halides remaining removed by fixing. At this point the cyan image is formed by treating the tripack with a solution of a water soluble ferrous salt.

The following examples will serve to illustrate my invention, but it is to be understood that the invention is not restricted thereto. It will be observed that these examples deal with the preparation of the complex formers, the preparation of azo dye couplers, the preparation of the tripacks for taking and printing, and the processing of such tripacks.

*Example I.—2-amino-4,6-dihydroxy-5-nitrosopyrimidine*

To a solution of 1.15 parts of sodium in 25 parts of absolute alcohol, there were added 4.75 parts of ethylisonitroso malonate, 2.25 parts of guanidine carbonate, and 50 parts of absolute alcohol. The reaction mixture was stirred vigorously under reflux for 3 hours. The bright red solid was removed by filtration, washed with alcohol and ether and dried. The weight was 5.1 parts. The material was dissolved in 50 parts of water and was acidified with dilute hydrochloric acid. The light tan precipitate which formed was collected on a filter, washed with water, and dried. The yield was 2 parts.

*Example II.—2-cyanoamino-4,6-dihydroxy-5-nitrosopyrimidine*

This product is prepared according to the method of Example I, while substituting for quanidine carbonate, an equivalent quantity of dicyandiamide.

*Example III.—2-decylamino-4,6-dihydroxy-5-nitrosopyrimidine*

To a solution of 0.46 part of sodium in 48 parts of absolute alcohol, there were added 2.4 parts of ethyl malonate and 2.3 parts of decylguanidine carbonate (prepared from decylamine and cyanamide), and the whole was refluxed for 6 hours. After the mixture had been concentrated by evaporation, it was diluted with 100 parts of water. Acidification with acetic acid precipitated 1.3 parts of 2-decylamino-4,6-dihydroxypyrimidine. One part of the above product was dissolved in 25 parts of absolute alcohol with the aid of 10% sodium hydroxide solution. A solution of 0.35 part of sodium nitrite in 5 parts of water was added, and the whole was slowly acidified with 6 N HCl to a pH of 2. After the addition of 150 parts of water, the precipitated solid was removed by filtration and was washed with water. The nitrosation procedure was repeated twice. The yield of air-dried product was 0.9 part.

*Example IV.—2-dodecylamino-4,6-dihydroxy-5-nitrosopyrimidine*

The product is prepared according to the method of Example III while substituting for the decylguanidine carbonate an equal quantity of dodecylguanidine.

*Example V.—2-carboxymethylamino-4,6-dihydroxy-5-nitrosopyrimidine*

To 75 parts of amyl alcohol there were added 4.75 parts of ethylisonitroso malonate, 2.9 parts of guanidino acetic acid, and 2.7 parts of sodium methoxide. The mixture was refluxed for 18 hours. The pink solid was collected on a filter, washed with ethanol, and air dried. The weight was 1.8 parts.

*Example VI.—2-(2'-tetradecoxy-5'-sulfoanilino)-4,6-dihydroxy-5-nitrosopyrimidine*

A. 2-TETRADECOXYPHENYLGUANIDINE-5-SULFONIC ACID

A mixture of 1.93 parts of 4-tetradecoxymetanilic acid, 0.21 part of cyanamide, and 10 parts of normal butyl alcohol was refluxed for 22 hours. The reaction mixture was cooled and the solid material was removed by filtration. The filter cake was extracted three times with boiling ethanol, leaving 1.5 parts of the guanidine derivative.

B. CONDENSATION WITH MALONIC ESTER

To a solution of 0.32 part of sodium in 10 parts of N-butyl alcohol, there were added 0.64 part of ethyl malonate, 1.5 parts of 2-tetradecoxyphenylguanidine-5-sulfonic acid, and 18 parts of butyl alcohol. The whole was refluxed for 15 hours. After the mixture had been cooled, the yellow solid was removed by filtration and was washed with ethyl alcohol. A sample of the material was nitrosated according to the procedure of Example III.

*Example VII.—4,6-dihydroxy-2-phenylsulfonamido-5-nitrosopyrimidine*

A solution of 2.3 parts of sodium in 50 parts of absolute alcohol was treated with 9.5 parts of ethylisonitrosomalonate which had been dissolved in 50 parts of absolute alcohol, and 10 parts of benzenesulfonylguanidine (prepared by benzenesulfonyl chloride and guanidine carbonate). The whole was refluxed for 3 hours. The pink colored precipitate was removed by filtration, suspended in water and acidified with HCl. The yellow colored precipitate was removed by filtration and was recrystallized from water. The yield was 3.5 parts.

4,6-dihydroxy-2-ethylsulfonamido-5-nitrosopyrimidine is prepared as above except that there is used in lieu of the benzenesulfonylguanidine an equivalent quantity of ethylsulfonylguanidine.

*Example VIII.—2-(4'-aminophenylsulfonamido)-4,6-dihydroxy-5-nitrosopyrimidine*

This product is prepared by the method of Example VII while substituting for the phenylsulfonylguanidine, an equal quantity of sulfaguanidine.

*Example IX.—1-phenyl-2-phenylimino-5-isonitrosohexahydropyrimidine-dione-4,6*

This product is prepared according to the method of Example VII, while substituting for the phenylsulfonylguanidine, an equal quantity of N,N-diphenylguanidine.

*Example X.—2-cyanimino-1-phenyl-5-isonitrosohexahydropyrimidine-dione-4,6*

This product is prepared according to the method of Example VII, while substituting for phenylsulfonylguanidine, an equal quantity of phenyldicyandiamide.

*Example XI.—2-dibutylamino-4,6-dihydroxy-5-nitrosopyrimidine*

This product is prepared according to the method of Example VI, while substituting for 2-tetradecoxyphenylguanidine-5-sulfonic acid, an equivalent quantity of N,N-dibutylguanidine (prepared from dibutylamine and S-methylisothiouronium sulfate).

*Example XII.—2-dioctylamino-4,6-dihydroxy-5-nitrosopyrimidine*

This product is prepared according to the method of Example VI, while substituting for the 2-tetradecoxyphenylguanidine-5-sulfonic acid, an equivalent amount of N,N-dioctylguanidine (prepared from dioctylamine and S-methylisothiouronium iodide).

*Example XIII.—6-amino-2-cyanamino-4-hydroxy-5-nitrosopyrimidine*

To a solution of 1.84 parts of sodium in 30 parts of absolute alcohol, there were added 1.7 parts of dicyandiamide, 2.84 parts of ethylisonitroso cyanoacetate and 70 parts of absolute alcohol. The whole was refluxed with stirring for 48 hours. The precipitate was removed by filtration and was washed with ethanol. The sodium salt was dissolved in water and the resulting solution was acidified with HCl to a pH of 1. The yellow pyrimidine derivative was removed by filtration, washed with water and dried. The yield was 3.5 parts.

*Example XIV.—6-amino-2-(4-aminophenylsulfonamido)-4-hydroxy-5-nitrosopyrimidine*

This product was prepared according to the method of Example XIII, substituting for the dicyandiamide an equivalent quantity of sulfaguanidine.

*Example XV.—N-(6-amino-4-hydroxy-5-nitroso-2-pyrimidyl)-N-octadecyltaurine*

A. N-OCTADECYLTAURINE

A mixture of 20.5 parts of octadecylamine and 10.6 parts of sodium-2-bromoethanesulfonate was stirred at 170–175° C. for 12 hours. The reaction mixture was allowed to cool to room temperature, broken up into small lumps, and extracted with acetone in a Soxhlet apparatus until the unchanged octadecylamine was removed (about 3 to 5 hours were required). The nearly white, insoluble material weighed 18 parts after drying. The solid was ground to a fine powder and was suspended in 275 parts of warm water.

The addition of 25 parts of 20% sodium hydroxide solution gave a clear viscous solution. This was filtered by suction, and the clear filtrate was acidified with 6 N sulfuric acid. After the mixture had been cooled to 10° C., the precipitate was removed by filtration and was washed with cold water. Recrystallization of the moist filter cake from dilute ethanol, using bone black for decolorization, yielded 8 parts of N-octadecyltaurine. The product does not have a sharp melting point but liquefies at about 290° C. in a preheated bath.

B. N-GUANYL-N-OCTADECYLTAURINE

To a refluxing solution of 11.5 parts of N-octadecyltaurine in 20 parts of butyl alcohol, there were added dropwise during a period of 5 hours a solution of 4 parts of cyanamide in 10 parts of butyl alcohol. After the addition was complete, the reaction mixture was refluxed for an additional 10 hours. A thick crystalline mass was produced in the cooled mixture. This was diluted with an equal volume of ethyl ether and the solid material was removed by filteration. The filter cake was triturated well with ether and was again removed by filtration. Recrystallization from absolute ethanol yielded 9 parts of N-guanyl-N-octadecyltaurine.

C. ETHYLISONITROSO CYANOACETATE

To a well agitated cooled solution of 75 parts of sodium nitrite in 390 parts of water, there were added 102 parts of ethyl cyanoacetate and the whole was treated with 75 parts of glacial acetic acid. The solution turned yellow and after ½ hour a yellow solid began to separate. After the mixture had been allowed to remain in an ice bath for 2 hours, the isonitroso compound was removed by filtration. The solid became colorless when it was digested with 150 parts of water containing 75 parts of HCl. The compound was dissolved in ether. The supernatant liquid was extracted with ether and the combined ether solution was dried over "Drierite." After the solvent had been removed, the residual isonitroso derivative was crystallized from water. The yield was 66 parts, melting at 128° C.

D. N-(4-HYDROXY-5-NITROSO-6-AMINO-2-PYRIDYL)-N-OCTADECYLTAURINE (DISODIUM SALT)

To a well agitated refluxing solution of 8.1 parts of sodium in 550 parts of absolute ethanol, there were added 42 parts of N-guanyl-N-octadecyltaurine, followed by 13.5 parts of ethylisonitroso cyanoacetate. The mixture first appeared yellow, gradually turned orange, and finally, after 8 hours, became a deep red color. After a reflux period of 48 hours, the solid pryimidine derivative was removed by filtration, washed with hot absolute ethanol and air dried. The product was purified (removal of unchanged N-guanyl-N-octadecyltaurine) by a Soxhlet extractor with absolute ethanol. The yield was 51.7 parts.

Example XVI.—N-(4,6-dihydroxy-5-nitroso-2-pyrimidyl)-N-octadecyltaurine

A. ETHYLISONITROSO MALONATE

To a stirred mixture of 160 parts of ethyl malonate and 180 parts of glacial acetic acid, there was added dropwise during a period of 9 hours a solution of 190 parts of sodium nitrite in 225 parts of water. The temperature was kept at 20–25° C. After the mixture had been allowed to remain overnight, the organic layer was separated and was diluted with twice its volume of ether (about 500 parts was required. The ether solution was washed in a separatory funnel with 1700 parts of 1% sodium carbonate solution, in five portions, to neutralize the acid. At the end of the last extraction, the wash water showed a pH of 7 and was pale yellow in color. The ether solution was washed further with three portions of water. After the solution had been dried over Drierite, the ether was removed and the residue was subjected to a vacuum distillation. The distillate, boiling at 149° C./2.5 mm., was a viscous colorless liquid which was obtained in a yield of 117 parts.

B. N-(4,6-DIHYDROXY-2-PYRIMIDYL)-N-OCTADECYLTAURINE

To a solution of 0.7 part of sodium in 20 parts of absolute alcohol, there was added a solution of 1.8 parts of ethyl malonate and 4.2 parts of N-guanyl-N-octadecyltaurine in 15 parts of absolute ethanol. The solution was heated under reflux for a period of 5 hours. The reaction mixture was concentrated to a thick paste on the steam bath, cooled, diluted with ether, and removed by filtration. The trisodium salt was dissolved in 25 parts of water and was precipitated from the solution by the addition of 6 N sulfonic acid. The product, which was removed by filtration, washed with water and air dried was obtained in a yield of 3 parts.

C. N-(4,6-DIHYDROXY-5-NITROSO-2-PYRIMIDYL)-N-OCTADECYLTAURINE

A solution of 3 parts of N-(4,6-dihydroxy-2-pyrimidyl)-N-octadecyltaurine in 50 parts of hot ethanol was made acid to Congo red with HCl, and was cooled in an ice bath to 10° C. A 10% aqueous solution of sodium nitrite was added until a positive test was obtained on starch-iodide paper. After the excess nitrous acid had been destroyed with sulfamic acid, the pale orange precipitate was removed by filtration and was washed with cold ethanol. The wet solid was suspended in 50 parts of ethanol, acidified with HCl and was again treated with 10% aqueous sodium nitrite solution until a positive test with starch-iodide paper was obtained. The product was removed by filtration and was washed with cold ethanol and with ether. The yield was 2.7 parts. After recrystallization from ethanol, 1.2 parts of the purified pyrimidine derivative was obtained.

SYNTHESIS OF COLOR FORMERS

Example XVII.—Azo yellow color former

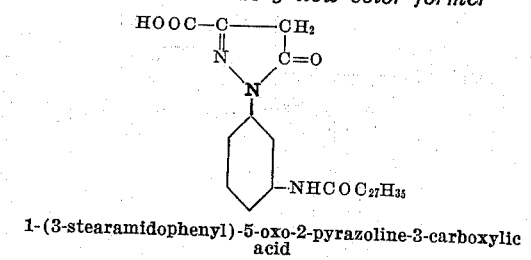

1-(3-stearamidophenyl)-5-oxo-2-pyrazoline-3-carboxylic acid

A well agitated warm (steam bath) solution of 53.7 parts of 1-(3-aminophenyl)-5-oxo-2-pyrazoline-3-carboxylic acid in 114 parts of pyridine and 336 parts of dimethylformamide was treated with 89 parts of freshly prepared stearoylchloride over a period of 1½ hours. The solution was heated on a steam bath until the diazotization test for free amino group was negative. The reaction mixture was poured into a solution of 128 parts of concentrated HCl in 2000 parts of water, and the precipitate was removed by filtration and was washed with water. After the compound had been dried in an oven at 50° C., it was extracted in a Soxhlet apparatus with high boiling petroleum ether to remove the stearic acid. The extracted solid was dissolved in a minimum amount of boiling pyridine, decolorized with "Norite," and treated with hot glacial acetic acid (approximately three times the volume of pyridine) to incipient cloudiness. The precipitated color former, which was removed by filtration from the cooled (50° C.) solution, was washed with cold 95% ethanol and air dried. The yield was 75.5 parts.

*Example XVIII.—Azo magenta color former*

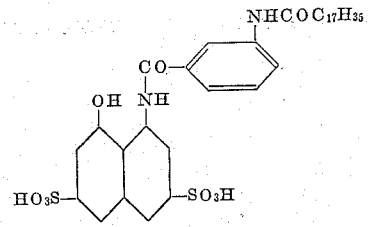

8-(3-stearamidobenzamido)-1-naphthol-3,6-disulfonic acid

To a solution of 92 parts of finely powdered 8-(3 - aminobenzamido) - 1 - naphthol - 3,6 - disulfonic acid in 400 parts of dimethylformamide and 100 parts of pyridine, there were slowly added 61 parts of freshly prepared stearoyl chloride. The mixture was heated on a steam bath for 30 minutes and then additional stearoyl chloride was added until a diazotization test showed the amino group to be completely acylated. The reaction mixture was poured into 2000 parts of 15% sodium chloride solution and 100 parts of concentrated HCl. After a period of 15 minutes, the precipitate was removed by filtration, digested with 2000 parts of 15% sodium chloride solution and was again removed by filtration. The filter cake was dried in vacuo at 50° C. The dried finely powdered solid was extracted once with boiling acetone and twice with low boiling petroleum ether. Sodium chloride was eliminated by an extraction of the product with dimethylformamide. The solvent was removed by vacuum distillation and the residue, which was digested with acetone, weighed 109.5 parts.

*Example XIX.—Preparation of multilayer printing material*

(1) Blue sensitive layer prepared by dispersing in a gelatino-silver halide emulsion a non-diffusing yellow azo dye, such as:

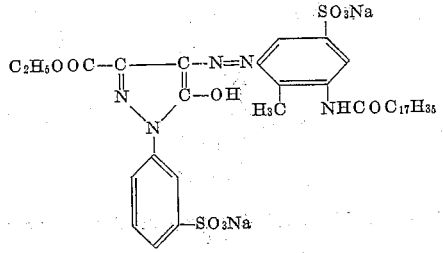

or

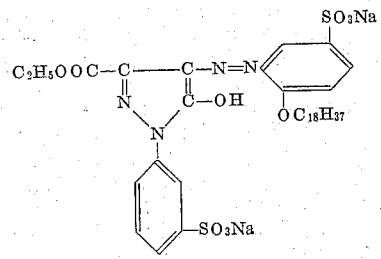

(See United States Patent 2,629,658, issued February 24, 1953.)

(2) Gelatine separation layer.
(3) Filter layer of yellow colloidal silver.
(4) Gelatin separation layer.
(5) Green sensitive layer prepared by dispersing in a gelatino-silver halide emulsion sensitized for green a non-diffusing magenta azo dye, such as:

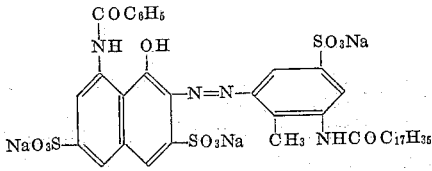

or

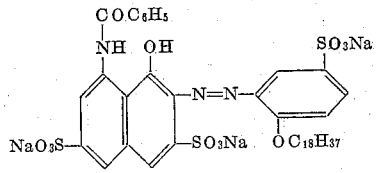

(See my aforesaid U. S. Patent 2,629,658.)
(6) Gelatin separation layer.
(7) Red sensitive layer prepared by dispersing in a gelatino-silver halide emulsion sensitized for red a non-diffusing cyan component, such as:

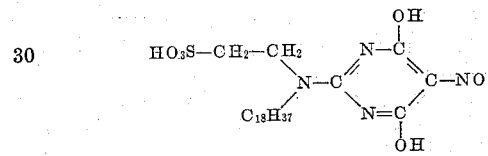

or

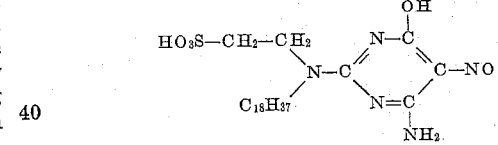

*Example XX.—Processing of multilayer printing material*

Step 1.—Exposure.
Step 2.—Development of primary silver image for 7 minutes with a developer constituted as follows:

| | |
|---|---|
| Water _____cc__ | 750 |
| Metol _____grams__ | 1.5 |
| Sodium sulfite (anhydrous) _____do____ | 45 |
| Sodium bisulfite _____do____ | 1 |
| Hydroquinone _____do____ | 3 |
| Sodium carbonate (monohydrate) _do____ | 6 |
| Potassium bromide _____do____ | 0.8 |
| Water to make _____cc__ | 1000 |

Step 3.—Shortstop and fix for 5 minutes with:

PART 1

| | |
|---|---|
| Water _____cc__ | 500 |
| Sodium thiosulfate _____grams__ | 240 |

PART 2

| | |
|---|---|
| Water _____cc__ | 150 |
| Sodium sulfite (anhydrous) _____grams__ | 15 |
| Acetic acid (28%) _____cc__ | 45 |
| Potassium alum _____grams__ | 15 |

Add Part 2 to Part 1, and add water to make 1000 cc.

Step 4.—Wash for 5 minutes.
Step 5.—Harden for 5 minutes with:

| | |
|---|---|
| Water _____cc__ | 1000 |
| Formaldehyde (36%) _____cc__ | 25 |
| Sodium bicarbonate _____grams__ | 50 |

Step 6.—Wash for 3 minutes.

Step 7.—Imagewise reduction of color components for 10 to 20 minutes with:

| | | |
|---|---|---|
| Water | cc | 1000 |
| Sulfuric acid (1.84) | cc | 75 |
| Potassium iodide | grams | 10 |
| Sodium hypophosphite | do | 5 |
| Quinoline | do | 50 |

Step 8.—Wash for 5 minutes.

Step 9.—Remove residual silver image by treatment for 5 minutes with:

| | | |
|---|---|---|
| Water | cc | 1000 |
| Copper sulfate | grams | 100 |
| Potassium bromide | do | 100 |
| Hydrochloric acid | cc | 5 |

Step 10.—Wash for 5 minutes.

Step 11.—Fix residual silver halide for 5 to 10 minutes with:

| | | |
|---|---|---|
| Water | cc | 1000 |
| Sodium thiosulfate | grams | 200 |
| Ammonium chloride | do | 80 |

Step 12.—Wash for 2 minutes.

Step 13.—Form cyan image by treatment for 3 minutes with:

| | | |
|---|---|---|
| Water | cc | 1000 |
| Ferrous ammonium sulfate | grams | 25 |
| Hydrochloric acid (6 N) | cc | 1.5 |
| Hypophosphorous acid (50%) | cc | 5 |

Step 14.—Wash for 15 minutes.

*Example XXI.—Preparation of high speed silver bleachout taking film*

(1) Blue sensitive layer containing as a nondiffusing azo yellow color former:

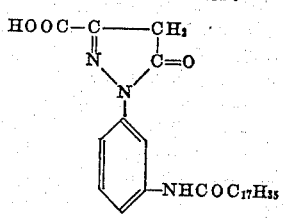

(2) Gelatin separation layer.
(3) Filter layer of yellow colloidal silver.
(4) Gelatin separation layer.
(5) Green sensitive layer containing as a nondiffusing azo magenta color former:

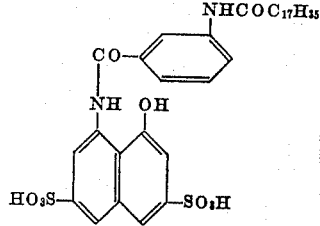

or

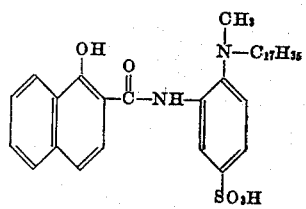

(Synthesis is described in FIAT Final Report No. 943, page 68.)

(6) Gelatin separation layer.
(7) Red sensitive layer containing as a nondiffusing cyan component:

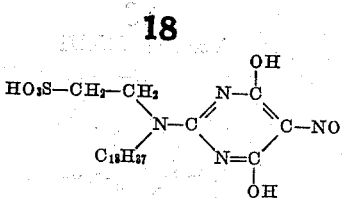

or

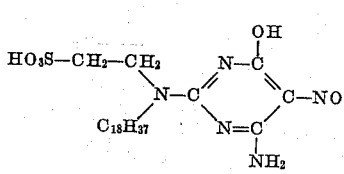

*Example XXII.—Processing of high speed silver bleachout taking film*

Step 1.—Exposure.

Step 2.—Development of primary silver image as in Example XX for 7 minutes.

Step 3.—Shortstop and fix as in Example XX for 5 minutes.

Step 4.—Wash for 5 minutes.

Step 5.—Formation of yellow and magenta dyed layers by coupling for 5 minutes of the color formers in the blue and green sensitive layers with diazotized benzidine-2,2'-disulfonic acid prepared as follows:

1.7 parts of benzidine-2,2'-disulfonic acid are dissolved in 300 parts of water containing 5 parts of aqueous sodium hydroxide (10%). A solution of 1 part of sodium nitrite in 10 parts of water is added, and the whole is treated at 10° C. with a solution of 3.5 parts of sulfuric acid (96%) in 25 parts of water. After a period of 10 minutes, the resulting diazonium salt solution is buffered to the correct coupling potential with 15 parts of sodium acetate trihydrate.

Step 6.—Wash for 3 minutes.

Step 7.—Harden for 5 minutes with:

| | | |
|---|---|---|
| Water | cc | 1000 |
| Formaldehyde (36%) | cc | 25 |
| Sodium bicarbonate | grams | 50 |

Step 8.—Wash for 5 minutes.

Step 9.—Imagewise reduction of color components for 10 to 20 minutes by treatment with the following bath:

| | | |
|---|---|---|
| Water | cc | 1000 |
| Sulfuric acid | cc | 75 |
| Potassium iodide | grams | 10 |
| Sodium hyposulfite | do | 5 |
| Quinoline | do | 50 |

Step 10.—Wash for 5 minutes.

Step 11.—Remove residual silver image by treatment for 5 minutes with:

| | | |
|---|---|---|
| Water | cc | 1000 |
| Copper sulfate | grams | 100 |
| Potassium bromide | do | 100 |
| Hydrochloric acid | cc | 5 |

Step 12.—Wash for 5 minutes.

Step 13.—Fix residual silver halide by treatment for 5 to 10 minutes with:

| | | |
|---|---|---|
| Water | cc | 1000 |
| Sodium thiosulfate | grams | 200 |
| Ammonium chloride | do | 80 |

Step 14.—Wash for 2 minutes.

Step 15.—Formation of cyan image by treatment for 3 minutes with:

| | | |
|---|---|---|
| Water | cc | 1000 |
| Ferrous ammonium sulfate | grams | 25 |
| Hydrochloric acid (6 N) | cc | 1.5 |
| Hypophosphorous acid (50%) | cc | 5 |

Step 16.—Wash for 15 minutes.

Example XXIII

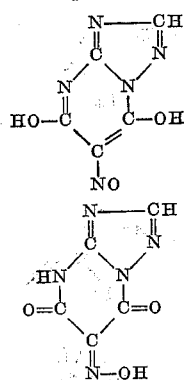

5,7-dihydroxy-6-nitroso-1,3,4-triazaindolizine

The above compound was prepared from 5,7-dihydroxy-1,3,4-triazaindolizine (prepared by the reaction of ethyl malonate and 3-amino-1,2,4-triazole to yield compound 9 of United States Patent 2,444,605) by the nitrosation process disclosed in Example III of this application. The nitroso compound when treated by the solution described in step 15 of Example XXII yielded a cyan colored image.

Example XXIV

5 - amino - 7 - hydroxy - 6 - nitroso - 1,3,4- triazaindolizine was prepared by nitrosating 5- amino - 7 - hydroxy - 1,3,4 - triazaindolizine (prepared by the reaction of ethyl cyanoacetate and 3-amino-1,2,4-triazole to yield compound 10 of United States Patent 2,444,605). The nitroso compound yielded a cyan image when a photographic emulsion layer was tested by the process indicated as step 15 of Example XXII.

This application is a division of my application Serial No. 156,730, filed on April 18, 1950, now U. S. Patent 2,635,960, issued April 21, 1953.

I claim:
1. Multilayer material capable of being processed by the silver dye bleachout method comprising a base, a red sensitive halide emulsion layer on the base containing as a color former for cyan a compound selected from the class consisting of those of the following formulae:

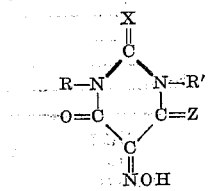

and

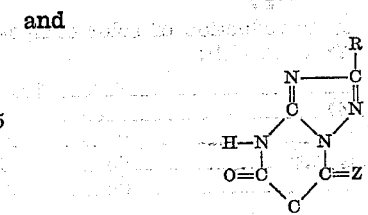

in which X is a member selected from the class consisting of =O, =X, =N—Y, or

Y is selected from the class consisting of hydrogen, cyano, aliphatic, and aromatic radicals, R and R' are selected from the class consisting of hydrogen, alkyl, and aryl, and Z is selected from the class consisting of =O and =NH, a green sensitive silver halide emulsion layer on the red sensitive layer containing a component selected from the class consisting of a non-diffusing magenta azo dye and a non-diffusing azo dye coupling component capable of yielding a magenta azo dye, and a blue sensitive silver halide emulsion layer on the red sensitive layer containing a component selected from the class consisting of a yellow non-diffusing azo dye and a non-diffusing azo dye coupling component capable of yielding a yellow azo dye.

2. The process of producing subtractively colored images in the phototgraphic multilayer material of claim 1, which comprises exposing the material, developing the same in a black and white developer, subjecting the material to the action of a bleachout bath for the purpose of forming yellow and magenta azo dye images in the blue and green sensitive layers which are reversed with respect to the silver images in such layers while simultaneously rendering the color former in the red sensitive layer incapable of forming a dyestuff at the places of the silver image, and treating the material with a water soluble ferrous salt solution in order to convert the color former in the red sensitive layer into a positive cyan dye image.

JOSEPH A. SPRUNG.

No references cited.